US012738226B2

(12) United States Patent
Lee et al.

(10) Patent No.: US 12,738,226 B2
(45) Date of Patent: Sep. 15, 2026

(54) DISPLAY PIXEL COMPENSATION CIRCUIT DEVICE USING DUAL SLOPE

(71) Applicant: KOREA UNIVERSITY RESEARCH AND BUSINESS FOUNDATION, Seoul (KR)

(72) Inventors: Hyung Min Lee, Seoul (KR); Jae Woong Ahn, Gimpo-si (KR); Seung Hun Choi, Gunpo-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 19/364,997

(22) Filed: Oct. 21, 2025

(65) Prior Publication Data

US 2026/0141855 A1 May 21, 2026

(30) Foreign Application Priority Data

Nov. 19, 2024 (KR) ........................ 10-2024-0165182

(51) Int. Cl.
*G09G 3/3233* (2016.01)

(52) U.S. Cl.
CPC ... *G09G 3/3233* (2013.01); *G09G 2300/0465* (2013.01); *G09G 2300/0819* (2013.01); *G09G 2300/0842* (2013.01); *G09G 2310/08* (2013.01); *G09G 2320/0233* (2013.01); *G09G 2330/021* (2013.01); *G09G 2330/12* (2013.01)

(58) Field of Classification Search
CPC ......... G09G 3/3233; G09G 2300/0465; G09G 2300/0819; G09G 2300/0842; G09G 2310/08; G09G 2320/0233; G09G 2330/021; G09G 2330/12
USPC .................................................... 345/214, 76
See application file for complete search history.

(56) References Cited

U.S. PATENT DOCUMENTS

| | | | | |
|---|---|---|---|---|
| 10,896,644 | B2 * | 1/2021 | Do | G09G 3/3258 |
| 2020/0058252 | A1 * | 2/2020 | Kim | G09G 3/3258 |

FOREIGN PATENT DOCUMENTS

| | | | | |
|---|---|---|---|---|
| KR | 20210080105 | A * | 6/2021 | G09G 3/32 |

* cited by examiner

*Primary Examiner* — Jimmy H Nguyen
(74) *Attorney, Agent, or Firm* — BROADVIEW IP LAW, PC

(57) ABSTRACT

A display pixel compensation circuit device using a dual-slope includes N channel multiplexers respectively coupled to sensing lines of corresponding channels; a sensing current conveyor configured to sense, on a target sensing line selected by control signals, a drain current of a target pixel's driving thin-film transistor; a noise current conveyor configured to sense, on an adjacent sensing line, panel noise, the adjacent sensing line being next to the target sensing line; and dual-slope error-detection circuitry configured to derive a pixel error from outputs of the two conveyors, convert the error into a sign value and an error value, and store these in a memory. In subsequent frames, the error value is arithmetically added to or subtracted from the digital pixel signal according to the sign value and supplied to respective channels, enabling real-time multi-bit correction with reduced silicon area and improved power efficiency.

7 Claims, 16 Drawing Sheets

FIG. 16

| Publication | JSSC 2019 [2] | TCAS-1 2023 [3] | TCAS-1 2023 [6] | VLSI 2024 [8] | This Work |
|---|---|---|---|---|---|
| Technology | N/A | 180 nm | 180 nm | 180 nm | 250 nm |
| Compensation Method | Internal Compensation | External Compensation | External Compensation | TFT Current Sensor | External Compensation |
| Pixel Structure | 6T2C | 3T1C | 3T1C | 4T1C | 4T1C |
| 1-H Time | N/A @ FHD+, 120 Hz | 5.1 µs @ QHD+, 60 Hz | N/A @ UHD, 120 Hz | 7.7 µs @ 4K, 60 Hz (VRR) | 7.2 µs @ UHD, 60 Hz (VRR) |
| Voltage Range | N/A | 4.5 V (0.1 V ~ 4.6 V) | N/A | N/A | 2.5 V (2.5 V ~ 5.0 V) |
| Current Range | 215 nA | 80 nA (8-bit) | N/A | 600 nA (11-bit) | 150 nA (8-bit) |
| Sensing Time | 33.3 µs | 20 µs | 300 µs | 38.4 µs | 25.2 µs |
| Compen. Area per Channel | N/A | 19825 µm$^2$ | N/A | 14600 µm$^{2}$ [A] | 4442.8 µm$^2$ |
| # of Channels per Compensator | N/A | 2 CHs | 2 CHs | 1 CH | 6 CHs |
| Compen. Power Consumption per Channel | N/A | 26 µW [B] | N/A | 81.4 µW | 13.3 µW |
| Max Current Error After Compen. | N/A | 6.03 LSB [C] | N/A | N/A | 5.17 LSB |
| Refresh Time | Real-Time | 16.9 s | 8.3 ms | Real-Time | Real-Time |
| Multi-CH Time Multiplexing Compensation | N/A | X | X | X | O |

[A] Including SD-IC Channel [B] External Component not Included [C] 64$^{th}$ Gray Level

DISPLAY PIXEL COMPENSATION CIRCUIT DEVICE USING DUAL SLOPE

CROSS-REFERENCE TO RELATED APPLICATION

This application claims the benefit of priority under 35 U.S.C. § 119(a) to Korean Patent Application No. 10-2024-0165182, filed on Nov. 19, 2024, the entire contents of which is incorporated herein by reference.

BACKGROUND

(a) Technical Field

The present disclosure relates to a display pixel compensation circuit device using dual slope.

(b) Background Art

An Organic Light-Emitting Diode (OLED; hereinafter, "OLED") is thin and lightweight, provides high power-consumption efficiency, and exhibits an excellent contrast ratio, and is therefore widely used in modern display devices. In the pixels of an OLED display, circuits employing Thin-Film Transistors (TFTs) are used, a representative basic circuit is the 3T1C circuit, composed of three thin-film transistors and one capacitor, as illustrated in FIG. 1.

In such OLEDs, the data voltage (VDATA) generated by the source driver (SD) is applied to the gate of the driving thin-film transistor (DTFT) in the pixel circuit, and the luminance is controlled in proportion to the amount of current thereby generated.

For mobile applications, the driving thin-film transistor is generally implemented using a low-temperature polycrystalline silicon (LTPS) thin-film transistor (TFT). However, due to the polycrystalline structure of this transistor, pixel-to-pixel variations arise in parameters of the driving TFT—such as the threshold voltage ($V_{TH}$) and mobility (collectively, $K_P$)—as illustrated in FIG. 1. Consequently, even when the same data is applied, different amounts of current are generated, leading to luminance non-uniformity.

To address this problem, as illustrated in FIG. 2, an internal compensation scheme has been investigated in which additional thin-film transistors and capacitors are arranged within the pixel to compensate for variations in threshold voltage, mobility, and the like. However, in such internal compensation schemes, additional thin-film transistors occlude the light-emitting aperture, thereby reducing the aperture ratio and lowering energy efficiency. Accordingly, because display lifetime is inversely proportional to power consumption, the display lifetime is shortened. In addition, compensation cannot be completed within the frame time, so additional sensing time is required before or after the frame driving period.

To overcome the drawbacks of internal compensation, external compensation schemes have recently been investigated. Unlike the internal approach, this method operates by detecting the characteristics of the driving thin-film transistor (DTFT) and modifying $V_{DATA}$ accordingly. By employing a simpler pixel circuit, the aperture ratio increases, resulting in improved energy efficiency, and the fabrication cost of each pixel circuit is reduced. In the external compensation scheme, as illustrated in FIG. 3, the drain current of each pixel's driving thin-film transistor (DTFT) may be sensed using a current-to-voltage converter (I-V converter) or a current integrator.

In the external compensation scheme employing a current-to-voltage converter, the sensed information obtained through the current-to-voltage converter is compared with the output of a current digital-to-analog converter (CDAC). The output of the CDAC corresponds to the amount of current that should be produced under an ideal condition for the given $V_{DATA}$. The comparison is performed by a 1-bit comparator, and, based on the comparator's output, compensation is carried out by incrementing or decrementing $V_{DATA}$ by one least significant bit (LSB). However, because the comparator output is 1-bit, if the deviation from the ideal value is large, compensation must be performed over multiple frames.

In the external compensation circuit employing a current integrator, rather than using real-time incoming data, a predetermined data value is applied during the vertical blanking period (V-Blank), and the drain current of the driving thin-film transistor (DTFT) produced thereby is sensed through the current integrator. Based on the sensed value, the threshold voltage is calculated in accordance with Equation (1), and $V_{DATA}$ is adjusted accordingly. However, this approach requires an external PC or controller in addition to the IC chip, thereby increasing system complexity, and compensation is performed during the vertical blanking period rather than in real time.

$$V_{TH,CAL} = \frac{\sqrt{I_{OLED2}}\,V_{SG1} - \sqrt{I_{OLED1}}\,V_{SG2}}{\sqrt{I_{OLED2}} - \sqrt{I_{OLED1}}} \quad \text{[Equation 1]}$$

In both approaches employing a current-to-voltage converter or a current integrator, the compensation circuit measures two pixels: one to sense the drain current of the driving thin-film transistor (DTFT) and the other to sense noise generated in the panel. However, in an OLED display having hundreds of pixels per line, such an architecture likewise requires hundreds of compensation circuits, leading to increases in overall silicon area and power consumption.

SUMMARY OF THE DISCLOSURE

The present disclosure is directed to providing a display pixel compensation circuit device using a dual-slope.

Additionally, the dual-slope-based compensation circuitry enables compensation without allocating a separate compensation period by virtue of fast sensing speed and rapid compensation time, increases the aperture ratio to improve display efficiency, and ensures a display free of luminance non-uniformity between pixels.

Further, while employing an external compensation approach, the device performs compensation using real-time incoming data and outputs a multi-bit (rather than 1-bit) compensation result, thereby enabling fast convergence.

Moreover, a single compensation circuit can serve a large number of pixels, thereby addressing issues of silicon area and power consumption.

According to one aspect of the present disclosure, a display pixel compensation circuit device using a dual-slope is provided.

According to an embodiment, the device comprises: N channel multiplexers respectively disposed on sensing lines of respective channels; a sensing current conveyor configured to sense, on a target sensing line selected according to control signals of the channel multiplexers, a current of a driving thin-film transistor (DTFT) of a target pixel; a noise current conveyor configured to sense, on an adjacent sensing line selected according to the control signals of the channel multiplexers, noise of a pixel, the adjacent sensing line being adjacent to the target sensing line; and dual-slope error-detection circuitry configured to convert a pixel error of the target pixel into a sign value and an error value using outputs of the sensing current conveyor and the noise current conveyor, and to store the sign value and the error value in a memory, wherein the error value is added to or subtracted from a digital signal ($D_{ORG}$) for pixel data of a next frame in accordance with the sign value and is delivered to respective channels.

The dual-slope error-detection circuitry may comprise: a current digital-to-analog converter (CDAC) configured to receive a digital signal ($D_{ORG}$) for pixel data of a current frame and convert the same into an ideal analog signal for the driving thin-film transistor; an integrator configured, after an output of the noise current conveyor and an output of the sensing current conveyor are connected at a first node to cancel noise, to connect to an output of the CDAC at a second node and integrate the pixel error; a comparator configured to output a result of comparing an output ($V_{OUT}$) of the integrator with a reference voltage ($V_{REF}$); and a counter configured to compare an output of the comparator with the reference voltage ($V_{REF}$), measure a comparison time ($\Phi_{COMP}$) required to restore the output ($V_{OUT}$) of the integrator to the reference voltage ($V_{REF}$), and output the error value ($D_{ERR}$) and the sign value ($D_{SIGN}$).

The device may further comprise signal-generation logic circuitry configured, based on an output of the comparator, to generate a push ($S_{PUSH}$) switch control signal or a pull ($S_{PULL}$) switch control signal, wherein the integrator is configured, in response to the $S_{PUSH}$ or $S_{PULL}$ Switch control signal, to increase or decrease an output current of a capacitor by $16 \cdot I_{LSB}$, $I_{LSB}$ denoting a current output corresponding to one least significant bit (LSB) of the CDAC.

The counter may be configured to calculate a duty cycle using the comparison time ($\Phi_{COMP}$), generate the error value ($D_{ERR}$) using the duty cycle, and determine whether an output voltage of the comparator is positive or negative to output the sign value ($D_{SIGN}$).

The dual-slope error-detection circuitry may operate sequentially in an initialization phase, an integration phase, and a restoration phase; in the initialization phase, values stored in the integrator are initialized; in the integration phase, the error is stored on a capacitor of the integrator; and in the restoration phase, according to the $S_{PUSH}$ or $S_{PULL}$ switch control signal, an output current of the capacitor of the integrator is decreased or increased by $16 \cdot I_{LSB}$.

The duty cycle represents a ratio of the error to $16 \cdot I_{LSB}$.

The CDAC may be configured to receive, as an input, the same digital signal as the digital signal ($D_{ORG}$) for each pixel data that is output on a per-frame basis by a timing controller and provided to a source driver.

BRIEF DESCRIPTION OF DRAWINGS

FIG. 16 is a diagram comparing pixel-compensation results of the prior art and an embodiment of the present invention.

DETAILED DESCRIPTION

Singular forms used in this specification include plural forms unless the context clearly indicates otherwise. In the specification, the term "configured", "include", or the like should not be construed as necessarily including several components or several steps described herein, in which some of the components or steps may not be included or additional components or steps may be further included. Further, the terms "~ unit", "module", and the like mean a unit for processing at least one function or operation and may be implemented by hardware or software or by a combination of hardware and software.

Hereinafter, the embodiments of the present disclosure will be described in detail with reference to the accompanying drawings.

Figure 1:
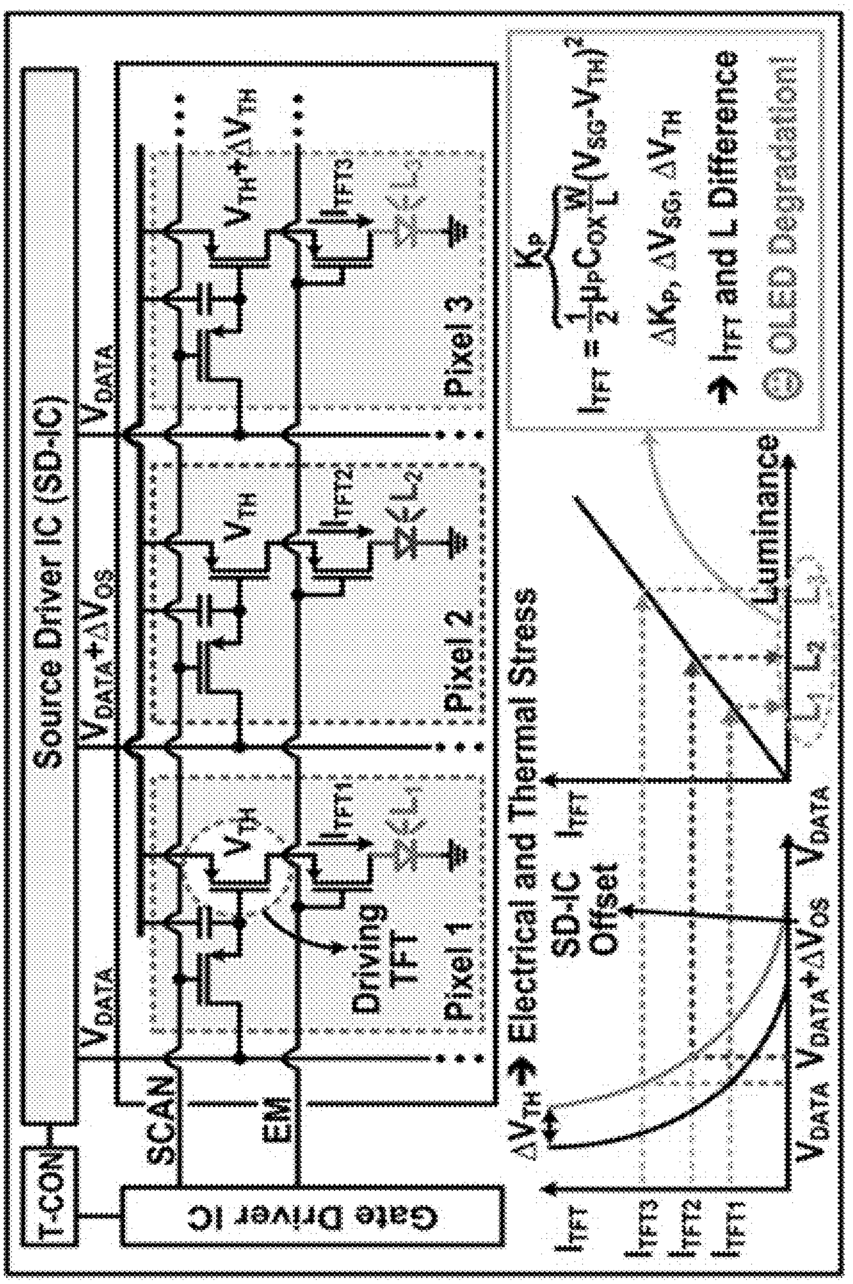
FIGS. 1 to 3 are diagrams illustrating the related art.
Figure 2:
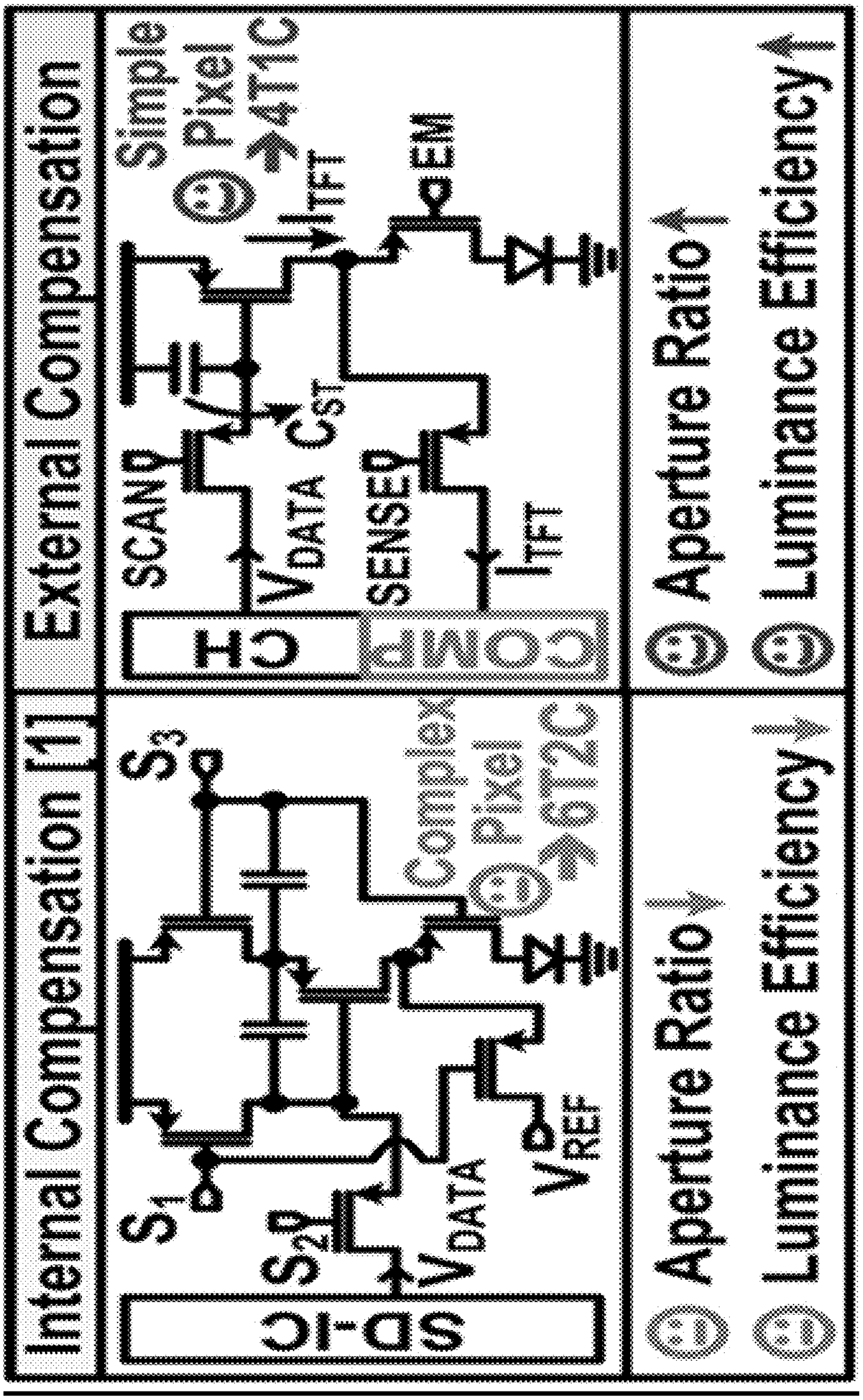
Figure 3:
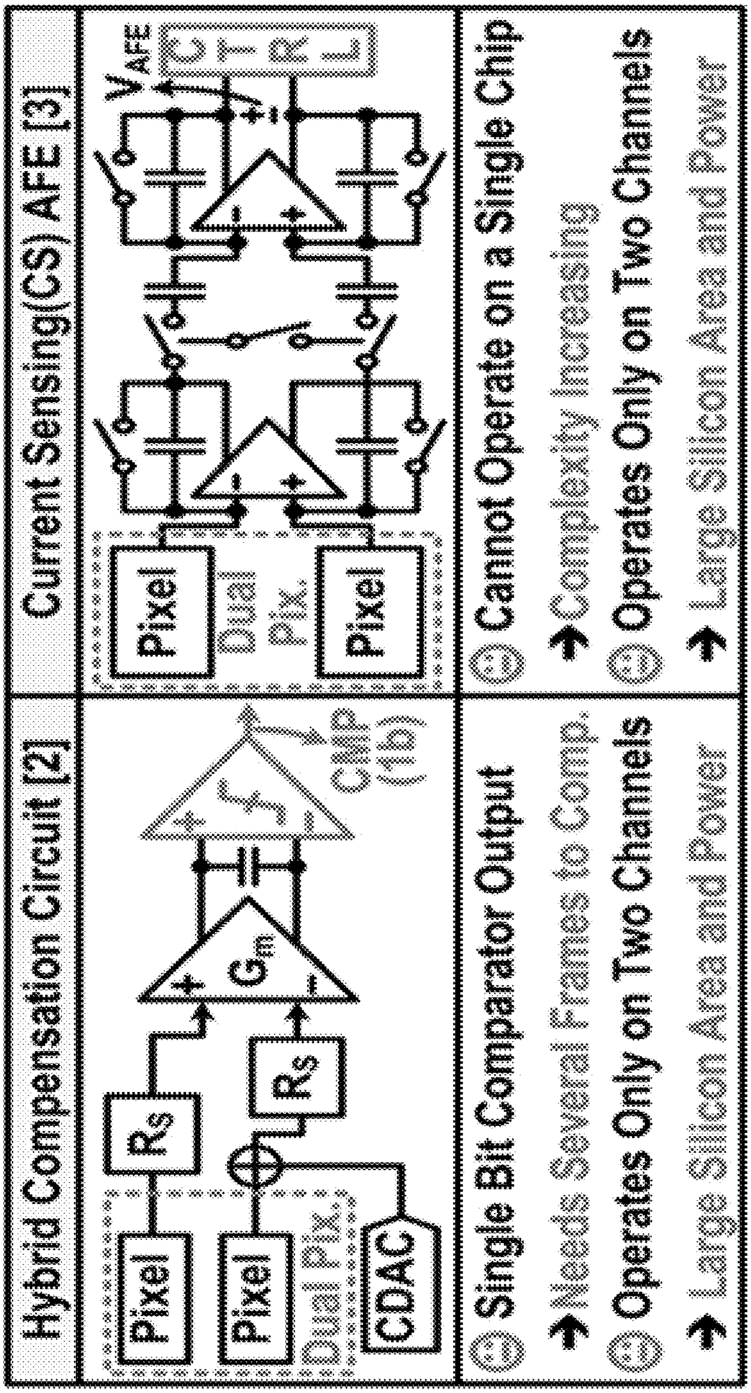
Figure 4:
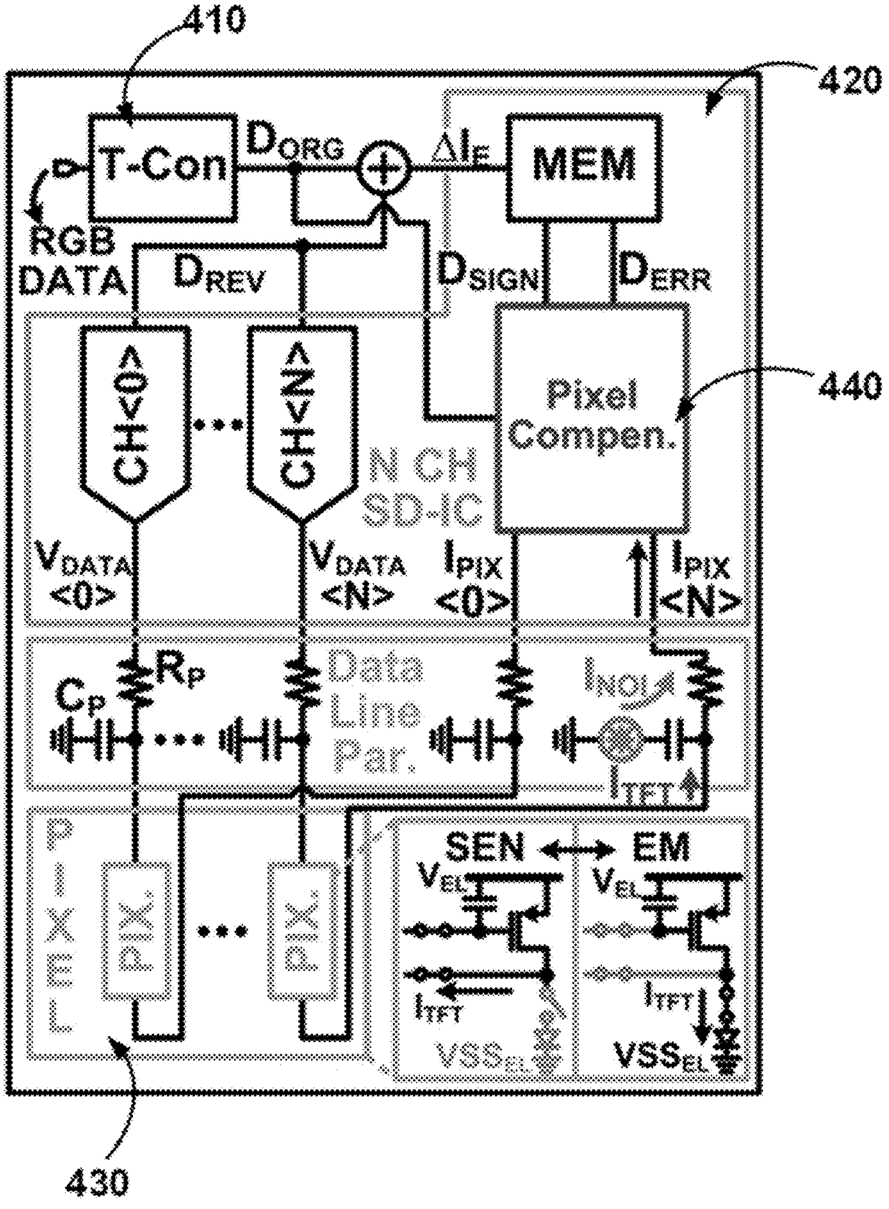
FIG. 4 is a diagram illustrating a display pixel compensation circuit device according to an embodiment of the present invention.
Figure 5:
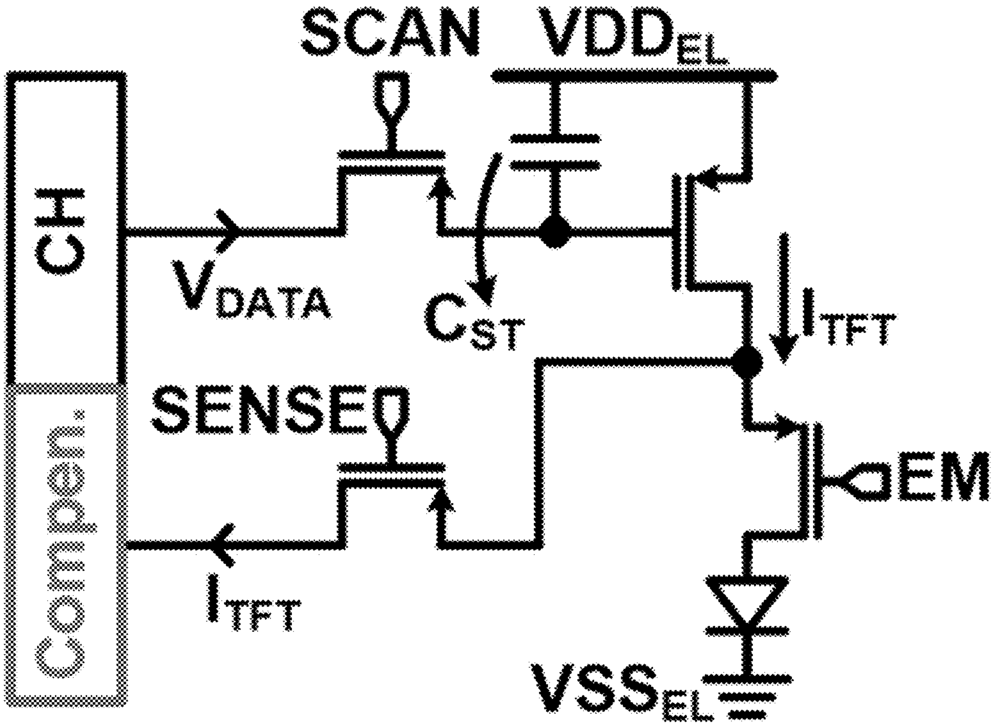
FIG. 5 is a circuit diagram of a pixel according to an embodiment of the present invention.
Figure 6:
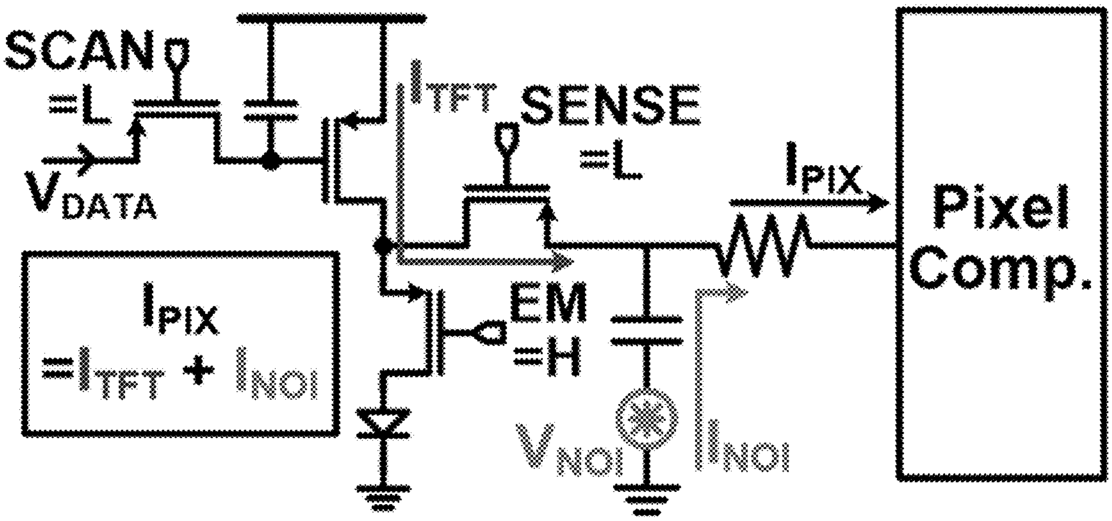
FIGS. 6 and 7 are diagrams for explaining the operation of the pixel circuitry according to an embodiment of the present invention.
Figure 7:
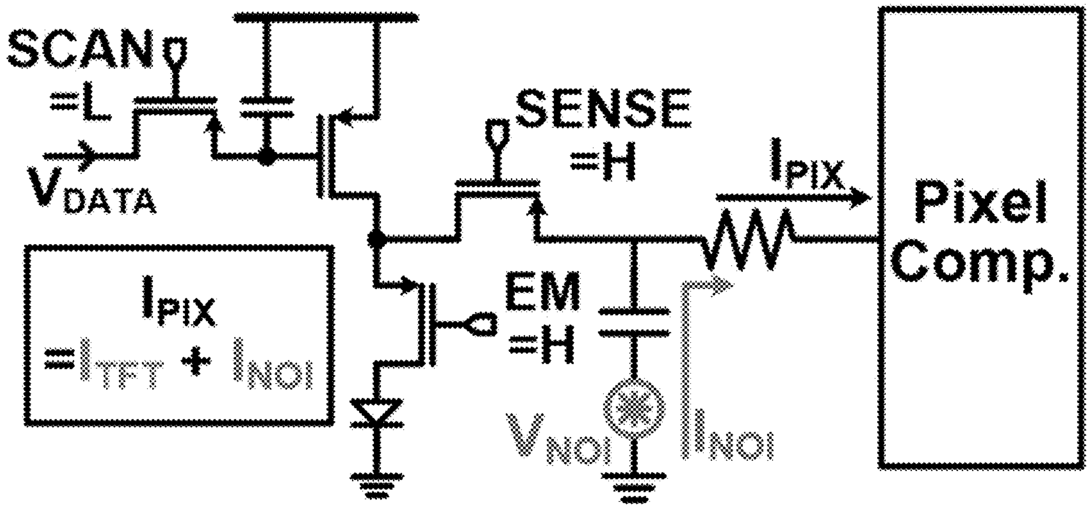
Figure 8:
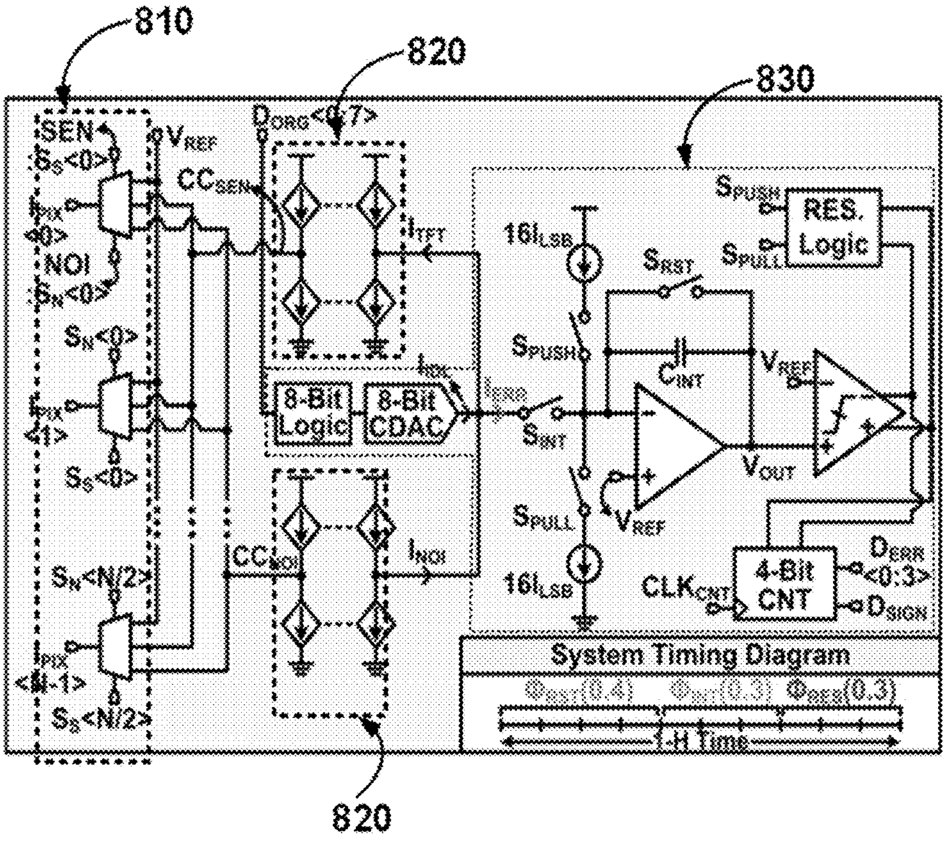
FIG. 8 is a detailed circuit diagram of the compensation circuitry according to an embodiment of the present invention.
Figure 9:
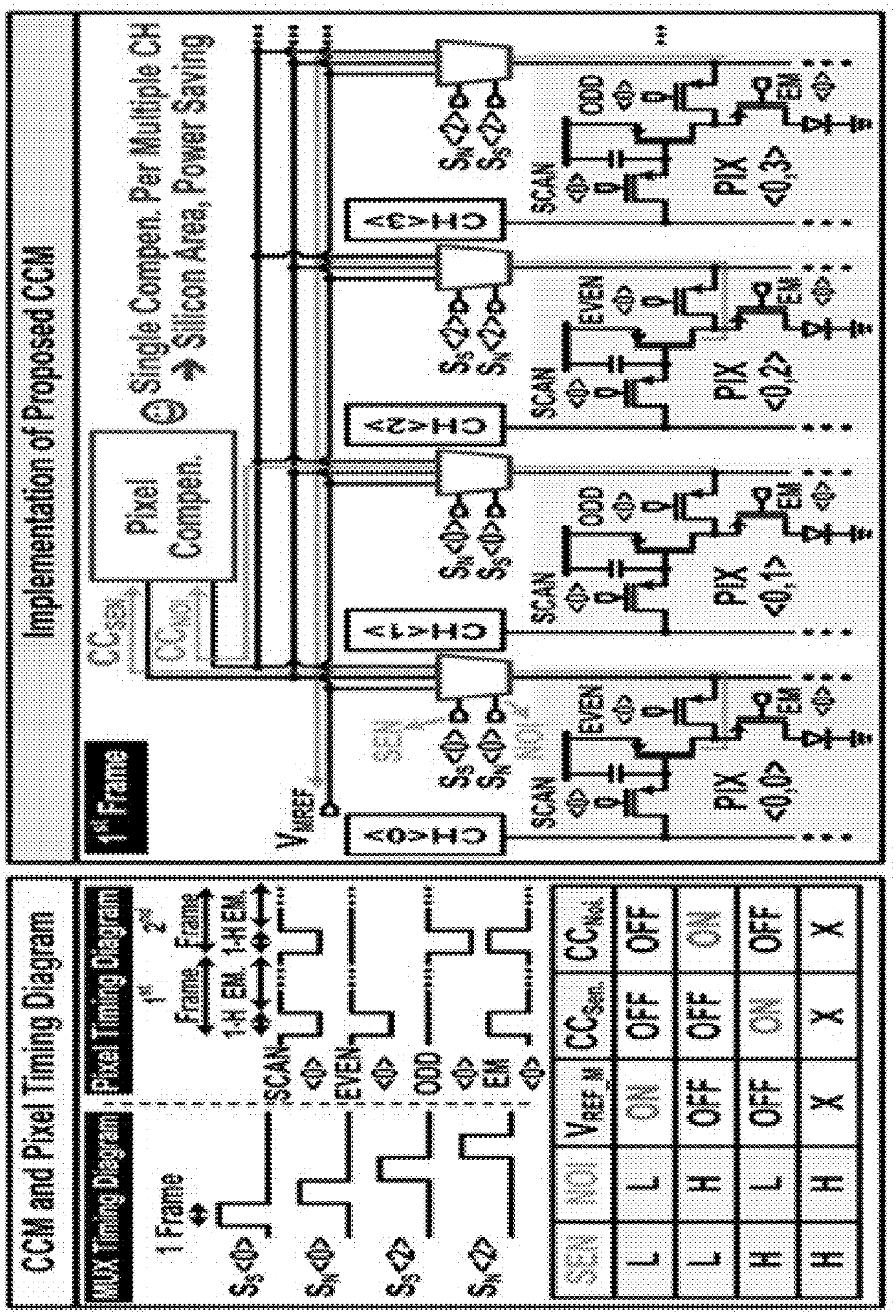
FIG. 9 is a diagram illustrating a channel multiplexer architecture and a timing diagram according to an embodiment of the present invention.
Figure 10:
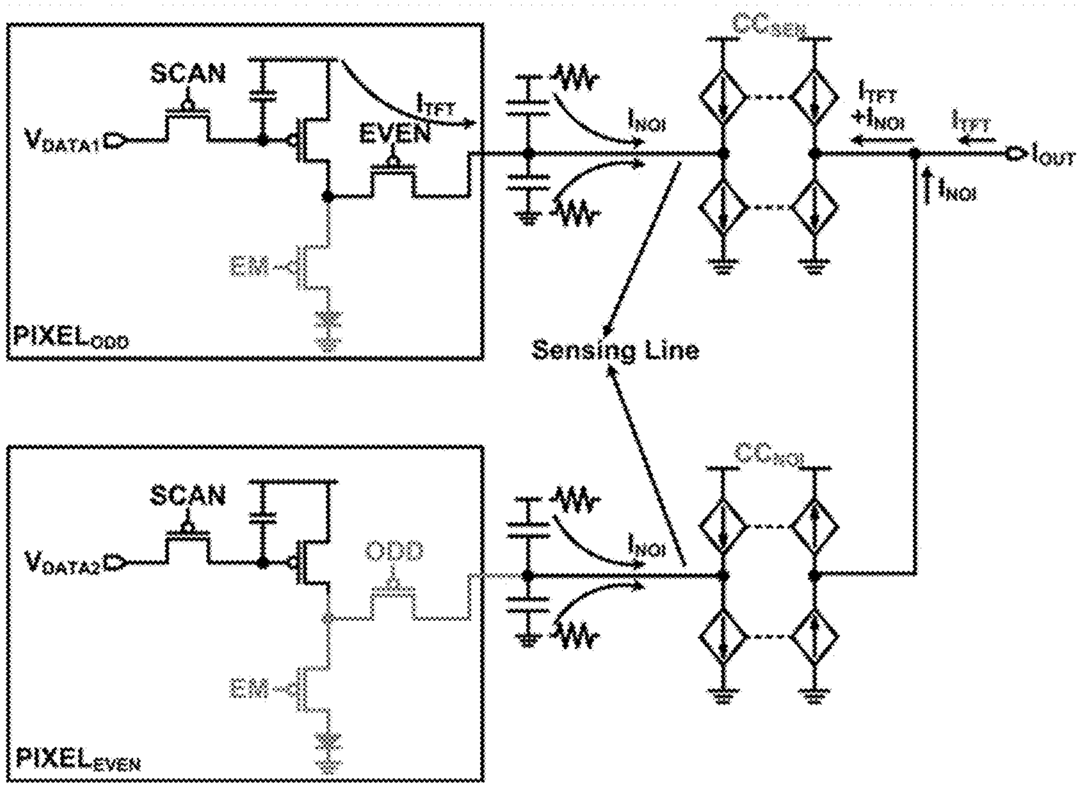
FIG. 10 is a diagram for explaining a noise-cancellation method using current conveyors according to an embodiment of the present invention.
Figure 11:
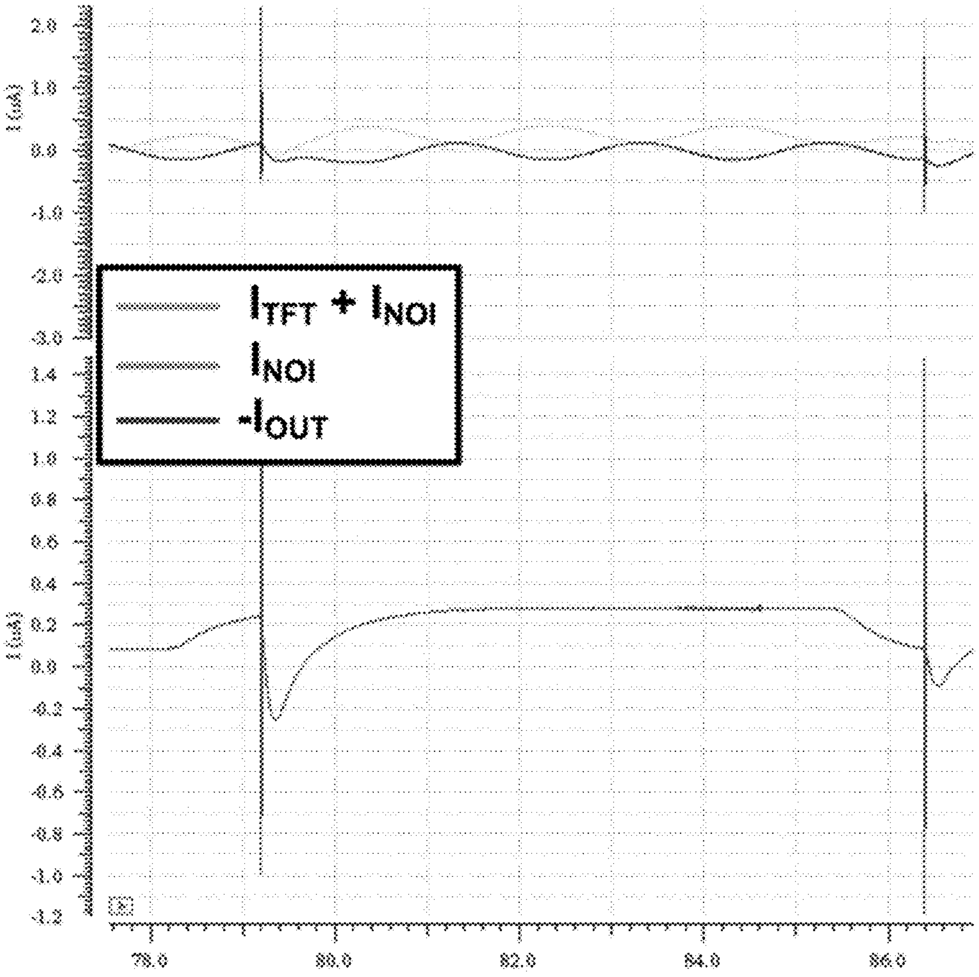
FIG. 11 is a diagram showing simulation results of noise cancellation using current conveyors according to an embodiment of the present invention.
Figure 12:
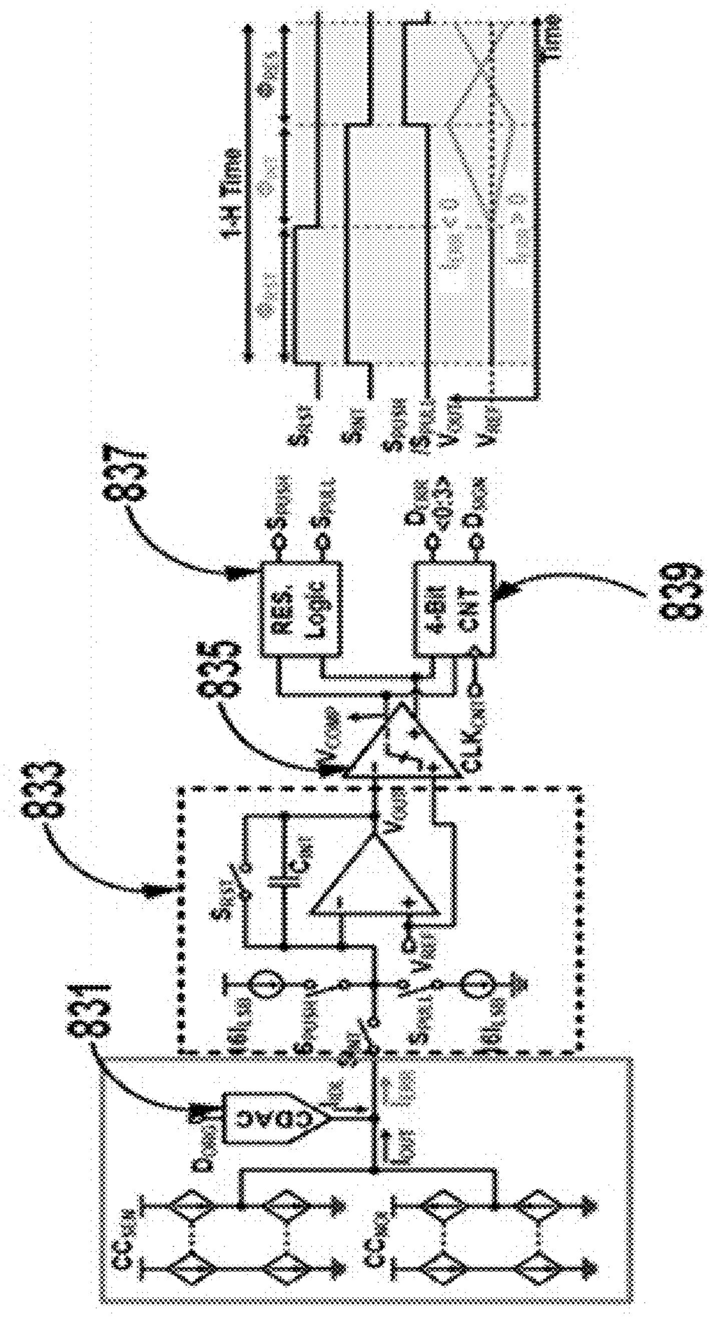
FIG. 12 is a diagram illustrating dual-slope error-detection circuitry and a timing diagram according to an embodiment of the present invention.
Figure 13:
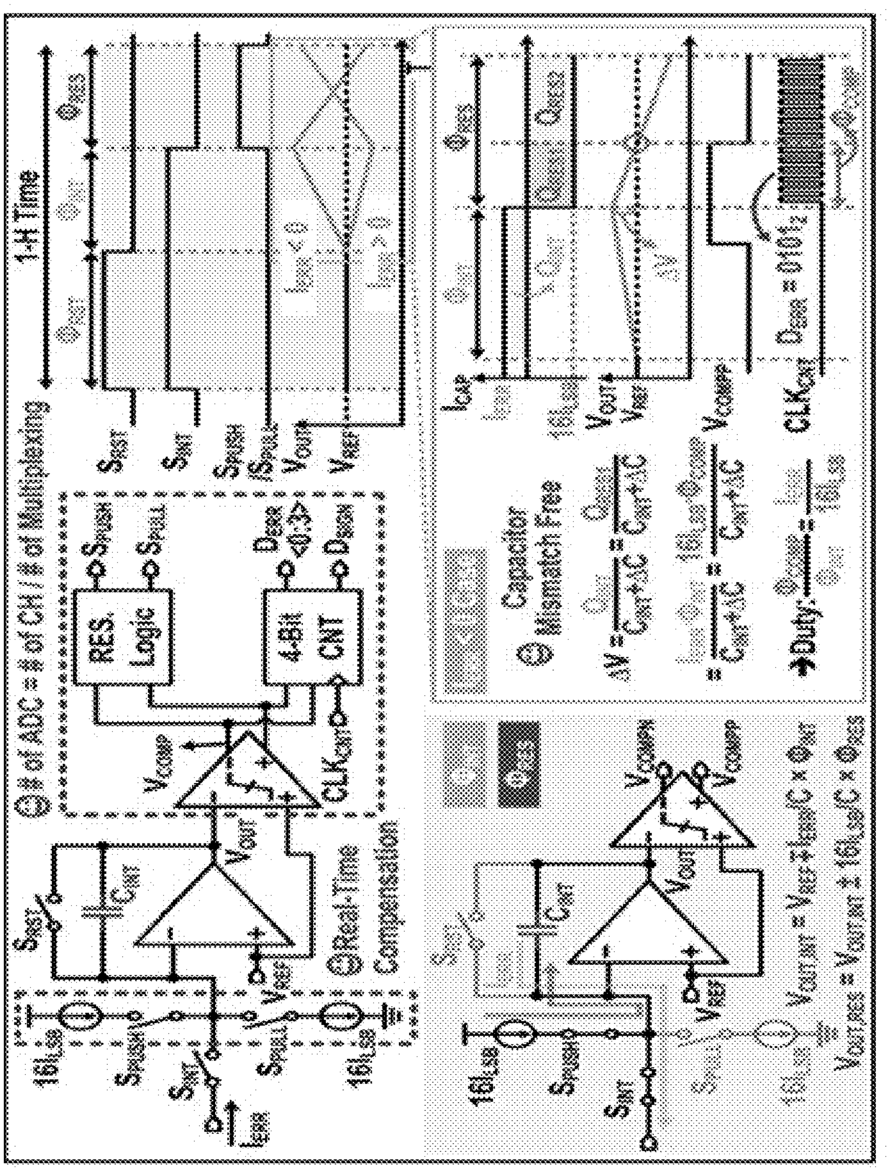
FIG. 13 is a diagram for explaining detailed operations in the integration and restoration phases according to an embodiment of the present invention.
Figure 14:
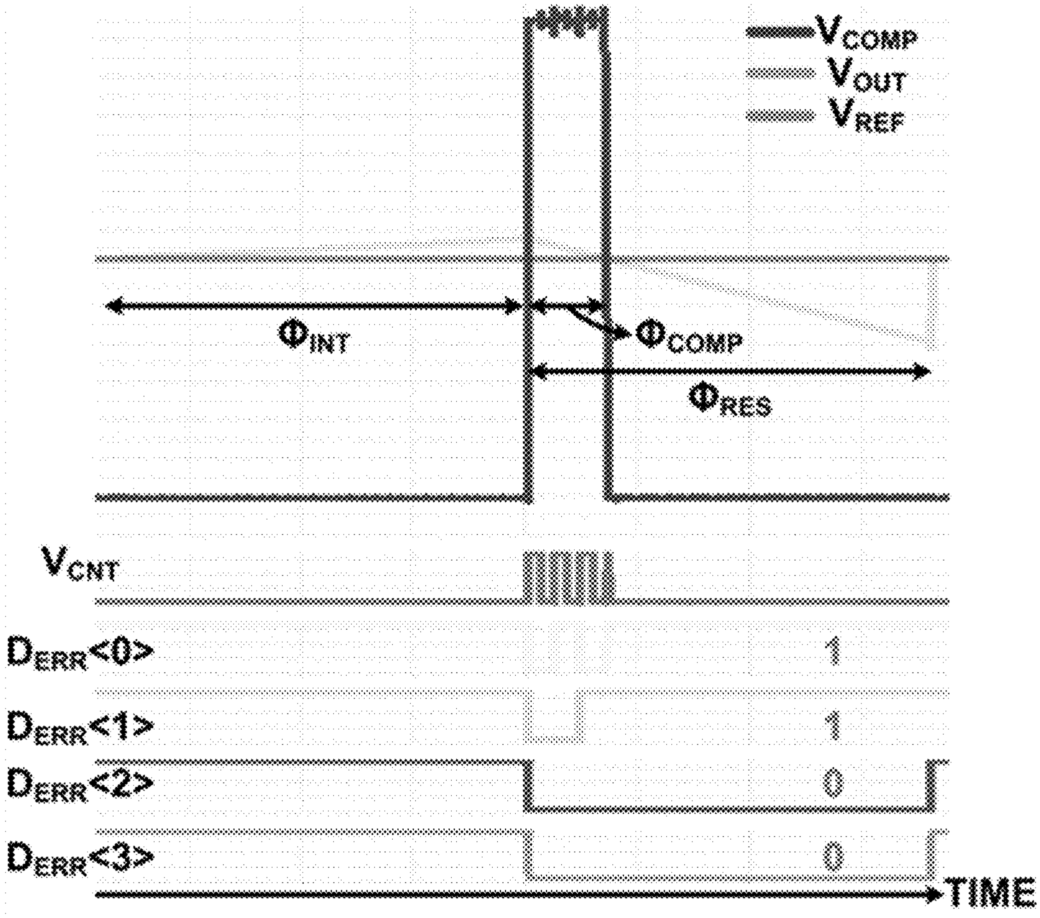
FIG. 14 is a diagram for explaining a comparison time according to an embodiment of the present invention.
Figure 15:
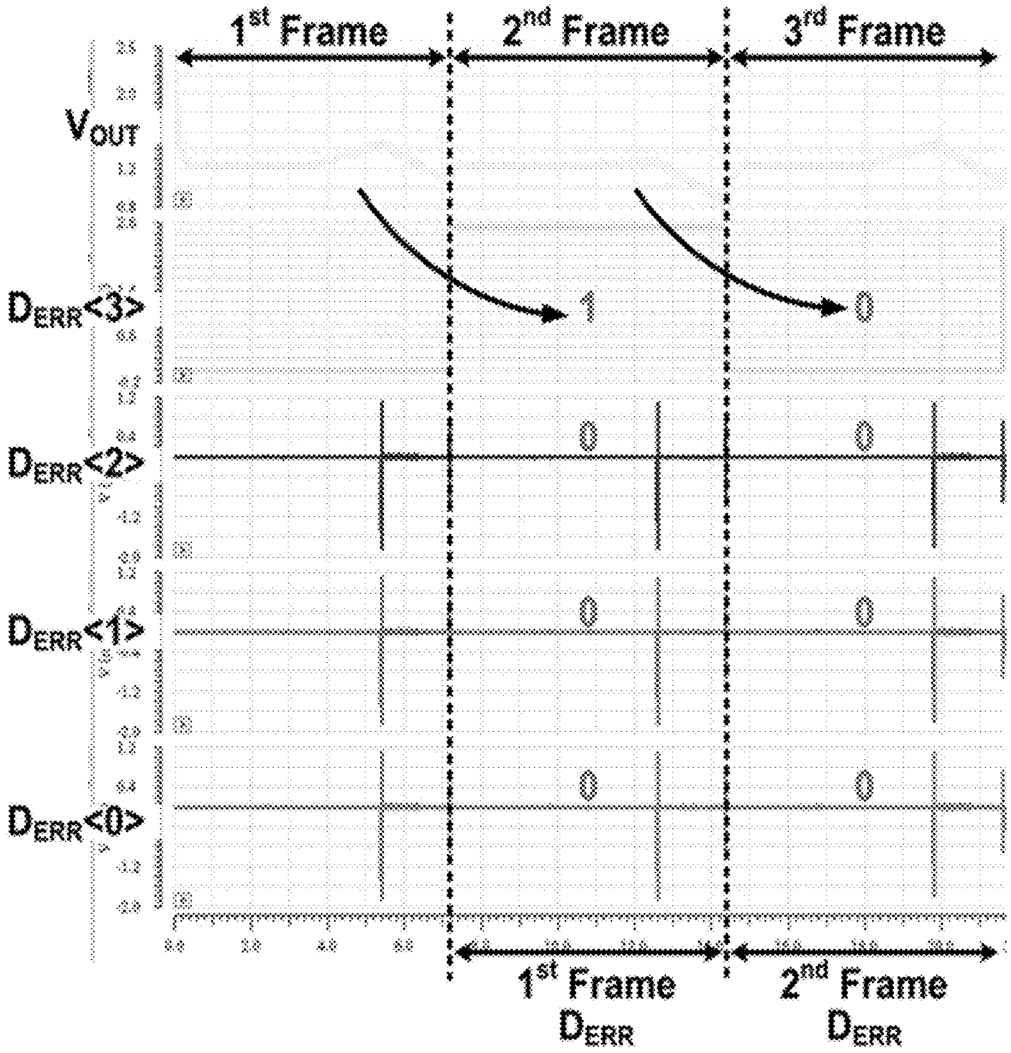
FIG. 15 is a diagram showing simulation results of error compensation according to an embodiment of the present invention.

FIG. 4 is a schematic diagram illustrating a display pixel compensation circuit device using a dual-slope according to an embodiment of the present invention; FIG. 5 is a circuit diagram of a pixel according to an embodiment; FIGS. 6 and 7 are diagrams for explaining the operation of the pixel circuit according to an embodiment; FIG. 8 is a detailed circuit diagram of the compensation circuitry according to an embodiment; FIG. 9 is a diagram illustrating a channel multiplexer architecture and a timing diagram according to an embodiment; FIG. 10 is a diagram for explaining a noise-cancellation method using current conveyors according to an embodiment; FIG. 11 is a diagram showing simulation results of noise cancellation using current conveyors according to an embodiment; FIG. 12 is a diagram illustrating dual-slope error-detection circuitry and a timing diagram according to an embodiment; FIG. 13 is a diagram for explaining detailed operations in the integration and restoration phases according to an embodiment; FIG. 14 is a diagram for explaining a comparison time according to an embodiment; and FIG. 15 is a diagram showing simulation results of error compensation according to an embodiment.

Referring to FIG. 4, a display pixel compensation circuit device using a dual-slope according to an embodiment of the present invention includes a timing controller (410), a source driver (420), and pixel circuitry (430).

The timing controller (410) may receive pixel data of an input image and timing signals synchronized therewith from a host system. After receiving pixel data (RGB data) for the respective pixel circuitry (430), the timing controller (410) may process the data into a digital signal ($D_{ORG}$) and provide the digital signal to respective channels of the source driver (420).

The source driver (420) may convert the digital signal ($D_{ORG}$) for each pixel data received from the timing controller (410) into an analog signal ($D_{DATA}$), generate a voltage appropriate for each pixel column, and deliver the voltage to the respective pixel circuitry (430) through corresponding channels.

Since the general operation in which the source driver (420) converts digital image data into analog voltage signals required for pixel control and thereby drives each pixel to a desired luminance and color is well known to those of ordinary skill in the art, a detailed description thereof will be omitted.

Hereinafter, the description will focus on the components necessary to explain the salient aspects of the present invention. Accordingly, it will be understood that the source driver (420) may have N channels, that N data lines and N sensing lines may be provided, and that gate lines intersecting the data lines and the sensing lines may be included.

As illustrated in FIG. 4, the source driver (420) may include compensation circuitry (440). The compensation circuitry (440) may sense, via two current conveyors, a target pixel current and noise respectively on one of the N sensing lines, thereby canceling noise and performing compensation of the error. This will be more clearly understood from the description set forth below.

For ease of understanding and explanation, the operation of each pixel circuitry (430) will be briefly described with reference to FIG. 5.

As shown in FIG. 5, each pixel circuitry (430) may be configured in a 4T1C structure including one driving thin-film transistor (DTFT), three switches (SCAN, SENSE, and EM), and one capacitor. Each pixel circuitry (430) may operate in a sensing mode or a light-emission mode according to the on/off combination of the three switches.

The sensing mode (SCAN) is a mode for sensing a current of the pixel circuitry (430), and the light-emission mode (EM) is a mode for delivering the current of the pixel circuitry (430) to the OLED.

According to an embodiment of the present invention, in the sensing mode (SCAN), the current output from the pixel circuitry (430) may differ depending on the operation of the SENSE switch.

This will be described with reference to FIGS. 6 and 7.

Referring to FIG. 6, in the sensing mode (SCAN), when the SCAN switch and the SENSE switch are turned on and the emission switch (EM) is turned off, an analog signal ($V_{DATA}$) delivered from the source driver (420) through the corresponding channel may be stored in the storage capacitor. As shown in FIG. 6, a source node of the driving thin-film transistor is connected to one end of the storage capacitor, and the other end of the storage capacitor may be connected to a gate node of the driving thin-film transistor. Accordingly, the driving thin-film transistor is driven by the analog signal ($V_{DATA}$) delivered through the channel, and a resulting drain current ($I_{TFT}$) may be delivered to, and sensed by, the compensation circuitry (440) of the source driver (420).

At this time, with the SENSE switch turned on, the compensation circuitry (440) in the source driver (420) may receive a pixel current ($I_{PIX}$) that is a sum of the drain current ($I_{TFT}$) of the driving thin-film transistor and panel noise ($I_{NOI}$) arising from parasitic components. More specifically, due to a parasitic component Cp of the sensing line and panel noise $V_{NOI}$, an additional noise current ($I_{NOI}$) is generated in addition to the drain current ($I_{TFT}$) of the driving thin-film transistor. Accordingly, when the SENSE switch is on in the sensing mode, the compensation circuitry (440) receives a combined current of the drain current ($I_{TFT}$) and the noise current ($I_{NOI}$).

In contrast, when the SENSE switch is off, only the noise current ($I_{NOI}$) is delivered to the compensation circuitry (440) (see FIG. 7).

In the light-emission mode, by contrast, the SCAN switch and the SENSE switch are turned off and the EM switch is turned on, thereby allowing the drain current ($I_{TFT}$) of the driving thin-film transistor to flow to the OLED and cause light emission.

Accordingly, the value delivered to the compensation circuitry (440) in the sensing mode varies depending on whether the SENSE switch of the pixel circuitry (430) is on or off. When the SENSE switch is on, a combined current of the driving TFT's drain current ($I_{TFT}$) and the noise current ($I_{NOI}$) is delivered to the compensation circuitry (440), whereas when the SENSE switch is off, only the noise current ($I_{NOI}$) is delivered to the compensation circuitry (440).

The compensation circuitry (440) senses, via two current conveyors, a drain current of the driving thin-film transistor (DTFT) of a target pixel on a selected target sensing line and a noise current via an adjacent sensing line, and cancels the noise using the sensing results of the two current conveyors to compensate for the error.

The compensation circuitry (440) may calculate a current error ($\Delta I_E$) relative to an ideal driving-TFT drain current ($I_{TFT}$) based on sensing results obtained through the two current conveyors, and may convert the current error into two digital data values—a sign value ($D_{SIGN}$) and an error value ($D_{ERR}$)—for storage in a memory. Here, the sign value ($D_{SIGN}$) indicates whether the current error ($\Delta I_E$) is negative or positive, and the error value ($D_{ERR}$) is a digital representation of the absolute value of the current error ($\Delta I_E$).

As described above, the sign value ($D_{SIGN}$) and the error value ($D_{ERR}$) stored in the memory are added to or subtracted from the digital signal ($D_{ORG}$) received in the next frame to compute compensation data ($D_{REV}$), and compensation proceeds by delivering the compensation data to the respective channels.

With reference to FIG. 8, this will be described in greater detail.

Referring to FIG. 8, the compensation circuitry (440) includes N channel multiplexers (810), two current conveyors (820), and dual-slope error-detection circuitry (830).

Assuming that the compensation circuitry (440) handles N sensing lines, a channel multiplexer (810) may be disposed for the sensing line of each channel. Accordingly, the N channel multiplexers (810) may be respectively connected to the N sensing lines.

That is, each sensing line of each channel may be connected to the output of the corresponding channel multiplexer (810). In addition, the inputs of each channel multiplexer (810) may be connected to the two current conveyors (820) and to a reference-signal line.

Referring to FIG. 9, the channel multiplexer (810) may, under control of a current-sensing control signal (SEN) and a noise-sensing control signal (NOI), connect one sensing line to either the sensing current conveyor or the noise current conveyor. Further, when neither the current-sensing control signal (SEN) nor the noise-sensing control signal (NOI) is asserted, the channel multiplexer (810) may connect a reference voltage ($V_{MREE}$) to the respective sensing lines.

Accordingly, the N channel multiplexers (810), under the control of the signals SEN and NOI, may connect one of the N sensing lines to the sensing current conveyor ($CC_{SEN}$), connect a sensing line adjacent to the selected sensing line to the noise current conveyor ($CC_{NOI}$), and connect the remaining sensing lines to the reference voltage ($V_{MREE}$).

For example, referring to FIG. 9, assume that the first column is sensed in a first frame.

As shown in FIGS. 9 and 10, $S_S$<0> is high (H) and the remaining signals are low (L). Accordingly, the sensing line of the first column is connected to the sensing current conveyor ($CC_{SEN}$), the sensing line of the adjacent second column is connected to the noise current conveyor ($CC_{NOI}$), and the others are all connected to $V_{MREE}$. The SENSE switches of the pixels are turned on and off per column in accordance with the EVEN and ODD signals. For instance, when the EVEN signal turns on the SENSE switches of even-numbered columns, the sensing current conveyor ($CC_{SEN}$) connected to the sensing line of the first column senses a signal that is the sum of the drain current ($I_{TFT}$) of the driving TFT and the noise current ($I_{NOI}$), and when the ODD signal turns off the SENSE switches of odd-numbered columns, the noise current conveyor ($CC_{NOI}$) connected to the sensing line of the adjacent second column senses only the noise current ($I_{NOI}$).

Accordingly, during the first frame, the compensation circuitry (440) receives information of the pixels in the first column and performs compensation; in the second frame, only $S_N$<0> is high (H), so that information of the pixels in the second column is received and compensated.

The sensing current conveyor ($CC_{SEN}$) and the noise current conveyor ($CC_{NOI}$) output to the same node in opposite phase. Because adjacent pixels exhibit similar amounts of noise, the output current (IOUT) cancels the noise as in Equation 2, leaving only the drain current $I_{TFT}$ of the driving thin-film transistor (DTFT).

$$I_{OUT} = I_{NOI} - (I_{TFT} + I_{NOI}) = -I_{TFT} \quad \text{[Equation 2]}$$

As shown in FIG. 11, when the pixel's drain current ($I_{TFT}$) is combined with the noise current ($I_{NOI}$), the output current (IOUT) fluctuates. In this case, as illustrated in FIG. 10, the noise current ($I_{NOI}$) can be effectively removed by subtracting the current sensed by the sensing current conveyor ($CC_{SEN}$) from the noise current delivered by the noise current conveyor ($CC_{NOI}$).

Consequently, the value received through the channel multiplexer (810) has the noise removed via the noise current conveyor, and only the driving-TFT current ($I_{TFT}$) is delivered to the dual-slope error-detection circuitry (830).

The dual-slope error-detection circuitry (830) can compensate for a pixel error of the driving thin-film transistor (DTFT) by using the DTFT current ($I_{TFT}$) and an ideal DTFT current. This will be more clearly understood from the following description.

The dual-slope error-detection circuitry (830) includes a current digital-to-analog converter (831), an integrator (833), a comparator (835), signal-generation logic circuitry (837), and a counter (839).

The current digital-to-analog converter (831) receives, from the timing controller (410), a digital signal ($D_{ORG}$) for each pixel and outputs an ideal drain current ($I_{IDL}$) that should be produced by the ideal driving thin-film transistor. For each frame, the digital signal ($D_{ORG}$) for each pixel data output from the timing controller (410) may be delivered respectively to the source driver (420) and to the current digital-to-analog converter (831).

As illustrated in FIG. 12, after noise is removed by the two current conveyors, a pixel error is obtained as a difference between the drain current of the driving thin-film transistor and an output of the current digital-to-analog converter (831), namely $I_{ERR}=I_{IDL}-I_{TFT}$, and the pixel error is delivered to the dual-slope error-detection circuitry (830).

As shown in FIG. 13, the dual-slope error-detection circuitry (830) operates in three phases-initialization, integration, and restoration—and these three phases may be performed during one horizontal scan period (1–H time).

In the initialization phase ($\Phi_{RST}$), the dual-slope error-detection circuitry (830) initializes the values previously stored in the integrator. A reset switch is turned on by a reset control signal ($S_{RST}$), thereby clearing the values stored in the integrator. In this phase, the dual-slope error-detection circuitry (830) prepares to perform time integration of the pixel error ($I_{ERR}$) until the pixel current ($I_{PIX}$) and the output ($V_{OUT}$) of the integrator reach the reference voltage ($V_{REF}$).

In the subsequent integration phase (INT), the pixel error ($I_{ERR}$) is stored on a capacitor of the integrator, and the comparator (835) compares an output ($V_{OUT}$) of the integrator with a reference voltage ($V_{REF}$) to determine whether to activate the $S_{PUSH}$ switch or the $S_{PULL}$ switch. When the error ($I_{ERR}$) is positive, the output ($V_{OUT}$) of the integrator becomes smaller than the reference voltage ($V_{REF}$), when the error ($I_{ERR}$) is negative, the output ($V_{OUT}$) becomes greater than the reference voltage ($V_{REF}$). Accordingly, if $V_{REF}>V_{OUT}$, the $S_{PULL}$ switch is readied for operation, and if $V_{REF}<V_{OUT}$, the $S_{PUSH}$ switch is readied for operation.

The signal-generation logic circuitry (837) may, based on an output of the comparator, generate a push ($S_{PUSH}$) switch control signal or a pull ($S_{PULL}$) switch control signal.

Then, in the restoration phase, according to the $S_{PULL}$ or $S_{PUSH}$ determined in the integration phase, an amount corresponding to $16 \cdot I_{LSB}$ is added to or subtracted from the integrator (833). Here, $I_{LSB}$ denotes the current output corresponding to one least significant bit (LSB) of the current digital-to-analog converter (CDAC). Accordingly, an output ($V_{OUT}$) of the integrator changes and is restored to the reference voltage ($V_{REF}$). The counter (839) measures a comparison time ($\Phi_{COMP}$) required for the output ($V_{OUT}$) of the integrator to return to the reference voltage ($V_{REF}$) and, after the comparison time ($\Phi_{COMP}$) has elapsed, calculates a duty cycle, which may be used to generate the error value ($D_{ERR}$). In addition, the sign value ($D_{SIGN}$) may be determined using a comparator output voltage ($V_{COMP}$). The duty cycle is based on charge transfer of an integrator capacitor ($C_{INT}$), thereby eliminating the effect of mismatch of the capacitor ($C_{INT}$) and causing the error value ($D_{ERR}$) to reflect only the relationship between the pixel error ($I_{ERR}$) and $16 \cdot I_{LSB}$.

Referring to the case where the error ($I_{ERR}$)<0 in the integration phase ($\Phi_{INT}$) and the restoration phase ($\Phi_{RES}$), in the integration phase the error ($I_{ERR}$) is integrated, and the difference ($\Delta V_{INT}$)) between the final output ($V_{OUT}$) of the integrator (833) and the reference voltage ($V_{REF}$) can be expressed as Equation 3.

$$\Delta V_{INT} = \frac{I_{ERR} \cdot \Phi_{INT}}{C_{INT} + \Delta C} \quad \text{[Equation 3]}$$

Additionally, in the restoration phase ($\Phi_{RES}$), the difference ($\Delta V_{INT}$) between the final output ($V_{OUT}$) of the integrator (833) and the reference voltage ($V_{REF}$) after $\Phi_{comp}$ time corresponding to the comparison time ($\Delta V_{COMP}$) can be expressed as Equation 4. Here, the $\Delta C$ denotes the error (mismatch) of the integrator capacitor ($C_{INT}$).

$$\Delta V_{COMP} = \frac{16 I_{LSB} \cdot \Phi_{COMP}}{C_{INT} + \Delta C} \quad \text{[Equation 4]}$$

At the instant when Equation 3 and Equation 4 are equal—namely, when the integrator output ($V_{OUT}$), raised during the integration phase, is restored to the reference voltage ($V_{REF}$) in the restoration phase—the duty cycle between the comparison time ($\Phi_{COMP}$) and the integration time ($\Phi_{INT}$) can be expressed, as in Equation 5, as the ratio of the error ($I_{ERR}$) to $16 \cdot I_{LSB}$.

$$\frac{\Phi_{COMP}}{\Phi_{INT}} = \frac{I_{ERR}}{16 I_{LSB}} \quad \text{[Equation 5]}$$

Accordingly, by measuring the comparison time ($\Phi_{COMP}$)—the time for the integrator's output ($V_{OUT}$) to return to the reference voltage ($V_{REF}$)—using the comparator (835), the error can be represented as a 4-bit digital value, the error value ($D_{ERR}$), by the 4-bit counter (839). In this manner, the mismatch of the integrator capacitor ($C_{INT}$) can be cancelled.

Additionally, the sign value ($D_{SIGN}$) of the error may be determined according to whether the output of the comparator is positive or negative, as shown in FIG. 14. FIG. 14 presents simulation results assuming an error of 3.2 LSB, in which the dual-slope error-detection circuitry (830) outputs an error value ($D_{ERR}$) of $0011_2$ (binary).

The error value ($D_{ERR}$), which is the output of the dual-slope error-detection circuitry (830), is stored in a memory and, in the next frame, is combined with data received via the timing controller (410), the combined data then being provided as an input to the source-driver channel.

FIG. 15 is a diagram showing simulation results in which the error is removed in the next frame after the error value ($D_{ERR}$) is applied. In the first frame, an error value ($D_{ERR}$) of $1000_2$ (binary) is measured, and in the second frame, a value obtained by adding the error value ($D_{ERR}$) to the originally received data is provided as the channel input, so that the error value ($D_{ERR}$) in the second frame becomes $0000_2$ (binary), indicating that no error is detected.

As described above, the compensation circuitry (440) according to an embodiment of the present invention can rapidly and accurately sense the current generated by the driving thin-film transistor by using current conveyors that provide wide bandwidth and a push-pull structure. In addition, by employing two current conveyors, noise can be effectively reduced, thereby decreasing compensation error.

Further, an error caused by the capacitor of the integrator (833) is removed through the integration and restoration phases, and the error can be represented using the ratio between the error current and the reference current. Moreover, the compensation circuitry (440) according to an embodiment allows one compensation block to handle N sensing lines, thereby significantly reducing area and power consumption.

FIG. 16 is a diagram comparing pixel-compensation results of the prior art and an embodiment of the present invention. While using an external compensation approach, the compensation circuitry according to an embodiment performs compensation using real-time incoming data and outputs a multi-bit result rather than a 1-bit result, enabling faster convergence; additionally, a single compensation circuit serves multiple channels, which reduces silicon area and power consumption.

The hardware device may be configured to operate as one or more software modules to perform the operation of the present disclosure, and vice versa.

The present disclosure was described above focusing on the embodiments thereof. It would be understood by those skilled in the art that the present disclosure may be implemented in a modified form without departing from the scope of the present disclosure. Therefore, the disclosed embodiments should be considered in terms of explaining, not limiting. The scope of the present disclosure is shown in the claims, not in the above description, and all differences within an equivalent range should be construed as being included in the present disclosure.

What is claimed is:

1. A display pixel compensation circuit device comprising:

N channel multiplexers respectively disposed on sensing lines of respective channels;

a sensing current conveyor configured to sense, on a target sensing line selected according to control signals of the channel multiplexers, a current of a driving thin-film transistor (DTFT) of a target pixel;

a noise current conveyor configured to sense, on an adjacent sensing line selected according to the control signals of the channel multiplexers, noise of a pixel, wherein the adjacent sensing line is a sensing line adjacent to the target sensing line; and dual-slope error-detection circuitry configured to convert a pixel error of the target pixel into a sign value and an error value using outputs of the sensing current conveyor and the noise current conveyor, and to store the sign value and the error value in a memory, wherein the error value is added to or subtracted from a digital signal (DORG) for pixel data of a next frame in accordance with the sign value and is delivered to respective channels.

2. The display pixel compensation circuit device of claim 1, wherein the dual-slope error-detection circuitry comprises:

a current digital-to-analog converter (CDAC) configured to receive a digital signal ($D_{ORG}$) for pixel data of a current frame and convert the same into an ideal analog signal for a driving thin-film transistor;

an integrator configured to receive a pixel error by first cancelling noise through connection of an output of the noise current conveyor and an output of the sensing current conveyor at a first node, and then, after the noise is removed, connecting to an output of the CDAC at a second node to integrate the pixel error;

a comparator configured to output a result of comparing an output ($V_{OUT}$) of the integrator with a reference voltage ($V_{REF}$); and a counter configured to compare an output of the comparator with the reference voltage ($V_{REF}$), measure a comparison time ($\Phi_{COMP}$) required to restore the output ($V_{OUT}$) of the integrator to the reference voltage ($V_{REF}$), and output the error value ($D_{ERR}$) and the sign value ($D_{SIGN}$).

3. The display pixel compensation circuit device of claim 2, further comprising signal-generation logic circuitry configured to generate a push ($S_{PUSH}$) switch control signal or a pull ($S_{PULL}$) switch control signal based on an output of the comparator, wherein the integrator is configured, in response to the push ($S_{PUSH}$) or pull ($S_{PULL}$) switch control signal, to add to or subtract from an output current of a capacitor by $16 \cdot I_{LSB}$, wherein $I_{LSB}$ denotes a current output corresponding to one least significant bit (LSB) of the current digital-to-analog converter.

4. The display pixel compensation circuit device of claim 3, wherein the dual-slope error-detection circuitry operates sequentially in an initialization phase, an integration phase, and a restoration phase;

in the initialization phase, values stored in the integrator are initialized;

in the integration phase, the error is stored in a capacitor of the integrator; and in the restoration phase, according to the push ($S_{PUSH}$) or pull ($S_{PULL}$) switch control signal, an output current of the capacitor of the integrator is decreased or increased by $16 \cdot I_{LSB}$.

5. The display pixel compensation circuit device of claim 2, wherein the counter is configured to calculate a duty cycle using the comparison time ($\Phi_{COMP}$), generate the error value ($D_{ERR}$) using the duty cycle, and determine whether an output voltage of the comparator is positive or negative to output the sign value ($D_{SIGN}$).

6. The display pixel compensation circuit device of claim 5, wherein the duty cycle represents a ratio of the error to $16 \cdot I_{LSB}$.

7. The display pixel compensation circuit device of claim 2, wherein the current digital-to-analog converter is configured to receive, as an input, the same digital signal as the digital signal ($D_{ORG}$) for each pixel data that is output by a timing controller on a per-frame basis and provided to the source driver.

* * * * *